(12) United States Patent
Kita et al.

(10) Patent No.: US 9,513,170 B2
(45) Date of Patent: Dec. 6, 2016

(54) SPECTRAL COLOR SENSOR AND IMAGE FORMING APPARATUS

(75) Inventors: Hiroshi Kita, Mishima (JP); Shun-ichi Ebihara, Suntou-gun (JP)

(73) Assignee: CANON KABUSHIKI KAISHA, Tokyo (JP)

(*) Notice: Subject to any disclaimer, the term of this patent is extended or adjusted under 35 U.S.C. 154(b) by 275 days.

(21) Appl. No.: 13/528,597

(22) Filed: Jun. 20, 2012

(65) Prior Publication Data

US 2013/0016352 A1 Jan. 17, 2013

(30) Foreign Application Priority Data

Jul. 15, 2011 (JP) ................ 2011-157121

(51) Int. Cl.
*G01J 3/46* (2006.01)
*G01J 3/50* (2006.01)
*G01J 3/52* (2006.01)

(52) U.S. Cl.
CPC ............... *G01J 3/502* (2013.01); *G01J 3/501* (2013.01); *G01J 3/524* (2013.01)

(58) Field of Classification Search
CPC ...... G03G 15/00; G03G 15/01; G03G 15/06; G03G 15/08; G03G 15/16; G03G 15/20; G03G 15/0105; G03G 15/5062; G03G 15/5058; G03G 15/0131; G03G 2215/00059; G03G 2215/0119; G03G 21/00; G01J 3/02; G01J 3/0208; G01J 3/0229; G01J 3/28; G01J 3/2823; G01J 3/26; G01J 3/513; G01J 3/18; G01J 3/027; G01J 3/2803; G01J 3/36; G01J 3/0205; G01J 3/0216; G01J 3/51; G01J 3/04; B41J 2/385; H04N 1/486; G01G 2215/00059; G01G 2215/0119
USPC .................................. 356/402, 425
See application file for complete search history.

(56) References Cited

U.S. PATENT DOCUMENTS 5,272,518 A * 12/1993 Vincent .................... 356/405
6,597,401 B1    7/2003 Maruyama ................ 348/335

(Continued)

FOREIGN PATENT DOCUMENTS

JP     6-022134    1/1994
JP    11-196230    7/1999

(Continued)

OTHER PUBLICATIONS

U.S. Appl. No. 13/523,807, filed Jun. 14, 2012. Applicants: Shun-ichi Ebihara et al.

(Continued)

*Primary Examiner* — Tarifur Chowdhury
*Assistant Examiner* — Sunghee Y Gray
(74) *Attorney, Agent, or Firm* — Fitzpatrick, Cella, Harper & Scinto

(57) ABSTRACT

A spectral color sensor including a spectroscopic unit that disperses reflected light from a measurement target, and a light detection element that detects the dispersed light from the reflected light, comprises: a storage unit that stores a correspondence relationship between a pre-measured wavelength of the dispersed light projected on the light detection element and a projection position, as well as a stray light component; a first correction unit that, based on a measurement result when a color is measured, corrects the correspondence relationship between the wavelength of the dispersed light projected on the light detection element and the projection position stored in the storage unit; and a second correction unit that carry out wavelength correction on the stray light component stored in the storage unit using the corrected correspondence relationship between the wavelength and the projection position.

11 Claims, 11 Drawing Sheets

(56) References Cited

U.S. PATENT DOCUMENTS

| | | |
|---|---|---|
| 7,269,369 B2 | 9/2007 | Tezuka et al. |
| 7,705,983 B2 | 4/2010 | Imura et al. .................. 356/328 |
| 7,982,908 B2 | 7/2011 | Kita et al. |
| 2003/0011767 A1* | 1/2003 | Imura et al. .................. 356/326 |
| 2005/0206907 A1* | 9/2005 | Fujimoto ........... G01B 11/0625 356/504 |
| 2009/0034003 A1* | 2/2009 | Makino .......................... 358/3.1 |
| 2009/0059224 A1* | 3/2009 | Imura ........................... 356/326 |
| 2011/0217052 A1 | 9/2011 | Usui et al. |
| 2011/0299104 A1 | 12/2011 | Seo et al. ....................... 358/1.9 |

FOREIGN PATENT DOCUMENTS

| | | |
|---|---|---|
| JP | 2002-171417 | 6/2002 |
| JP | 2008-185565 | 8/2008 |
| JP | 2010-256324 | 11/2010 |

OTHER PUBLICATIONS

U.S. Appl. No. 13/551,156, filed Jul. 17, 2012. Applicants: Shun-ichi Ebihara et al.

* cited by examiner

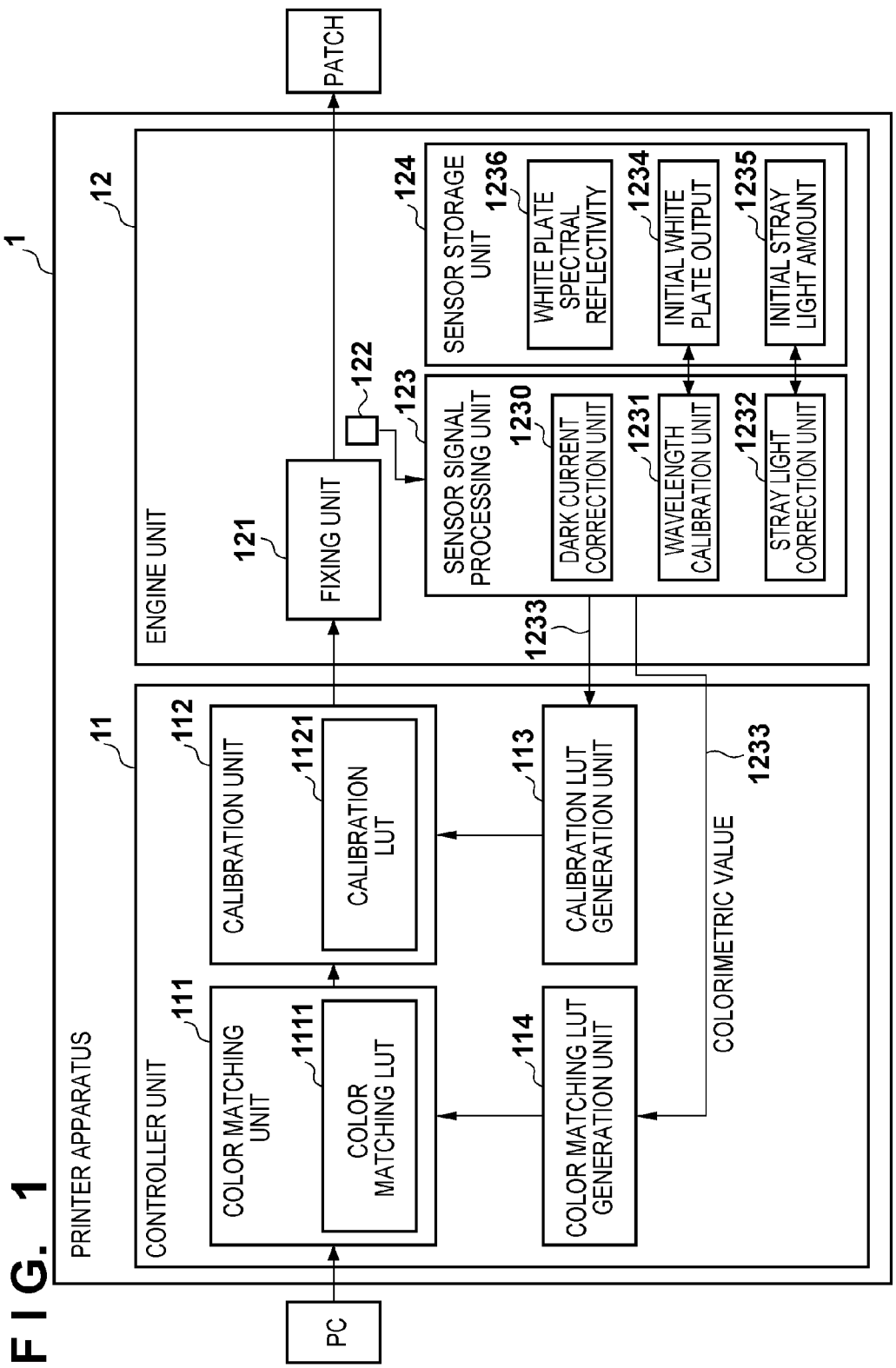

OUTLINE OF COLOR SENSOR

LINE SENSOR

FIG. 7C
PIXEL-TO-WAVELENGTH RELATIONSHIP

| PIXEL | ... | 15 | 16 | 17 | 18 | 19 | ... |
|---|---|---|---|---|---|---|---|
| WAVELENGTH (PRE-CORRECTION) | ... | 392 | 395 | 398 | 401 | 404 | ... |
| WAVELENGTH (POST-CORRECTION) | ... | 392.8 | 395.8 | 398.8 | 401.8 | 404.8 | ... |

FIG. 7D
PRE- AND POST-CORRECTION STRAY LIGHT AMOUNTS

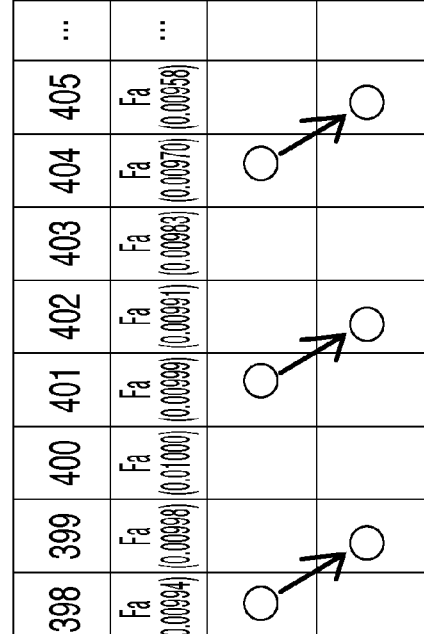

| WAVELENGTH (nm) | ... | 391 | 392 | 393 | 394 | 395 | 396 | 397 | 398 | 399 | 400 | 401 | 402 | 403 | 404 | 405 | ... | ... |
|---|---|---|---|---|---|---|---|---|---|---|---|---|---|---|---|---|---|---|
| INITIAL STRAY LIGHT AMOUNT1235 Fini($\lambda$) | | Fa (0.00910) | Fa (0.00923) | Fa (0.00935) | Fa (0.00950) | Fa (0.00962) | Fa (0.00975) | Fa (0.00985) | Fa (0.00994) | Fa (0.00998) | Fa (0.01000) | Fa (0.00999) | Fa (0.00991) | Fa (0.00983) | Fa (0.00970) | Fa (0.00958) | | |
| STRAY LIGHT AMOUNT USED IN SPECTRAL REFLECTIVITY CALCULATION (PRE-CORRECTION) | | | | | | | | | | | | | | | | | | |
| STRAY LIGHT AMOUNT USED IN SPECTRAL REFLECTIVITY CALCULATION (POST-CORRECTION) | | | | | | | | | | | | | | | | | | |

SPECTRAL COLOR SENSOR AND IMAGE FORMING APPARATUS

BACKGROUND OF THE INVENTION

Field of the Invention

The present invention relates to spectral color sensors and image forming apparatuses such as printers and photocopiers, and particularly relates to the removal of stray light components in a spectral color sensor.

Description of the Related Art

Conventionally, color conversion lookup tables (abbreviated as "LUT" hereinafter) are used in printing apparatuses such as printers in order to output desired colors. Color conversion LUTs include LUTs used in calibration for keeping the printer in a certain stable state, LUTs used in color matching such as ICC profiles, and so on.

Some models of printers include a spectral color sensor within the printer engine. This type of printer prints a color index (called a "patch" hereinafter) such as IT8 7/3 (ISO 12642 output target) prior to or during the execution of a print job, and measures the patch using the included spectral color sensor. The color measurement results are then fed back in order to generate a color conversion LUT. Through this, the stated printer can match colors and stabilize printing colors through a process internal to the printer, rather than using an external color measurement sensor.

Such a spectral color sensor includes light sources such as a white LED, a halogen lamp, three RGB LEDs, and so on within the apparatus, and irradiates a color measurement target with color measurement light. The spectral color sensor then constricts the reflected light therefrom using a slit, disperses the light using a prism, a diffraction grating, or the like, and obtains a spectral distribution. Area sensors are often used as the light detection elements in such spectral color sensors in order to reduce the size of the sensor unit, reduce the measurement time for each patch, and so on. However, it is known that a high color measurement accuracy cannot be obtained if the relationship between the pixels in the area sensor and the wavelength of the reflected light is not precise. For example, in the case where a spectral color sensor is provided within a printer, the optical system in the sensor will change as a result of the sensor body warping due to rising temperatures in the printer, differences in installation environments, the passage of time, and so on, thermal expansion of the diffraction grating, or the like. As a result, there are cases where the pixel-to-wavelength relationship of the area sensor shifts from the relationship that was certified at the time of assembly.

In response to this problem, as a known technique, a method has been proposed in which the wavelengths of the light entering into the pixels are specified by overlaying on each pixel of the area sensor a color filter that allows only visible light wavelengths to pass to the pixels of the area sensor. Alternatively, a LED single-color light source for wavelength calibration is provided within the spectral color sensor, and the pixel-to-wavelength relationship of the area sensor is recertified based on the absolute value of the emission line of the LED single-color light source, as in Japanese Patent Laid-Open No. 2008-185565.

Incidentally, the actual output of the spectral color sensor is the sum of the signal from the measurement target that is originally desired, and noise. In addition to dark outputs from light-receiving elements, stray light components that cannot be completely removed are present in noise. If these stray light components are not taken into consideration, they become noise components in the original signal, and cause a drop in the color measurement accuracy. Dark areas in particular have a low reflectance and a high influence on the color measurement accuracy, and thus it is necessary to remove such areas accurately. A method for removing stray light components when an optical sensor is in use is known, as disclosed in, for example, Japanese Patent Laid-Open No. 6-22134. Note that stray light is light resulting from some of the light source leaking within the sensor unit and that reaches the light-receiving element, causing noise. For the amount of stray light, it is normally necessary to provide a dedicated light absorbing body, such as a black body that absorbs irradiated light, on the color measurement surface that is irradiated with light when the light source is lighted, and measure only the stray light components.

It is assumed that the stray light components will fluctuate over periods of time such as hours or years, and thus it is desirable to be able to take measurements (update) as necessary. However, in the case where an attempt is made to measure stray light components with a printer that includes a spectral color sensor, a configuration that allows measurement using a white plate and a dedicated light absorbing body in an alternating manner is required, and there have thus been problems in that the space required for installation has increased, the apparatus has become complicated, and so on. Furthermore, even if the printer is not a type that, for example, is provided with an internal spectral color sensor, from the standpoint of usability, it is undesirable to employ a separate apparatus.

SUMMARY OF THE INVENTION

Accordingly, the present invention provides a spectral color sensor capable of updating stray light components and taking color measurements with a high level of accuracy without using a dedicated light absorbing body when a user uses the spectral color sensor, and provides an image forming apparatus such as a printer that includes such a spectral color sensor.

According to one aspect of the present invention, there is provided a spectral color sensor including a spectroscopic unit that irradiates a measurement target with light from a light source and disperses reflected light from the measurement target, and a light detection element that detects the dispersed light from the reflected light, the sensor comprising: a storage unit configured to store a correspondence relationship between a pre-measured wavelength of the dispersed light projected on the light detection element and a projection position, as well as a stray light component; a first correction unit configured to, based on a measurement result when a color is measured, correct the correspondence relationship between the wavelength of the dispersed light projected on the light detection element and the projection position stored in the storage unit; and a second correction unit configured to carry out wavelength correction on the stray light component stored in the storage unit using the correspondence relationship between the wavelength and the projection position corrected by the first correction unit.

According to another aspect of the present invention, there is provided a spectral color sensor including a spectroscopic unit that irradiates a measurement target with light from a light source and disperses reflected light from the measurement target, and a light detection element that detects the dispersed light from the reflected light, the sensor comprising: a storage unit configured to store a pre-measured stray light component; and a correction unit configured to perform wavelength correction on the stray light component stored in the storage unit.

According to another aspect of the present invention, there is provided an image forming apparatus comprising: an image forming unit configured to form an image; a spectroscopic unit configured to irradiate a measurement target with light from a light source and disperses reflected light from the measurement target; a light detection element configured to detect the dispersed light from the reflected light; a storage unit configured to store a correspondence relationship between a pre-measured wavelength of the dispersed light projected on the light detection element and a projection position, as well as a stray light component; a first correction unit configured to, based on a measurement result when a color is measured, correct the correspondence relationship between the wavelength of the dispersed light projected on the light detection element and the projection position stored in the storage unit; and a second correction unit configured to carry out wavelength correction on the stray light component stored in the storage unit using the correspondence relationship between the wavelength and the projection position corrected by the first correction unit, wherein an image formation condition of the image forming unit is controlled in accordance with a second correction result in which a detection result detected by the light detection element has been corrected based on a first correction result of the correction performed by the second correction unit.

According to another aspect of the present invention, there is provided an image forming apparatus comprising: an image forming unit configured to form an image; a spectroscopic unit configured to irradiate a measurement target with light from a light source and to disperse reflected light from the measurement target; a light detection element configured to detect the dispersed light from the reflected light; a storage unit configured to store a pre-measured stray light component; and a correction unit that performs wavelength correction on the stray light component stored in the storage unit, wherein an image formation condition of the image forming unit is controlled in accordance with a second correction result in which a detection result detected by the light detection element has been corrected based on a first correction result of the correction performed by the correction unit.

According to the present invention, it is possible to provide a spectral color sensor capable of updating stray light components and taking color measurements with a high level of accuracy using a simple configuration, and an image forming apparatus that includes such a spectral color sensor.

Further features of the present invention will become apparent from the following description of exemplary embodiments (with reference to the attached drawings).

BRIEF DESCRIPTION OF THE DRAWINGS

FIG. 1 is a block diagram illustrating an example of the configuration of a printer apparatus.

FIGS. 7A, 7B, 7C, and 7D are diagrams illustrating a stray light amount recalculation method according to the first embodiment.

DESCRIPTION OF THE EMBODIMENTS

Figure 2A:
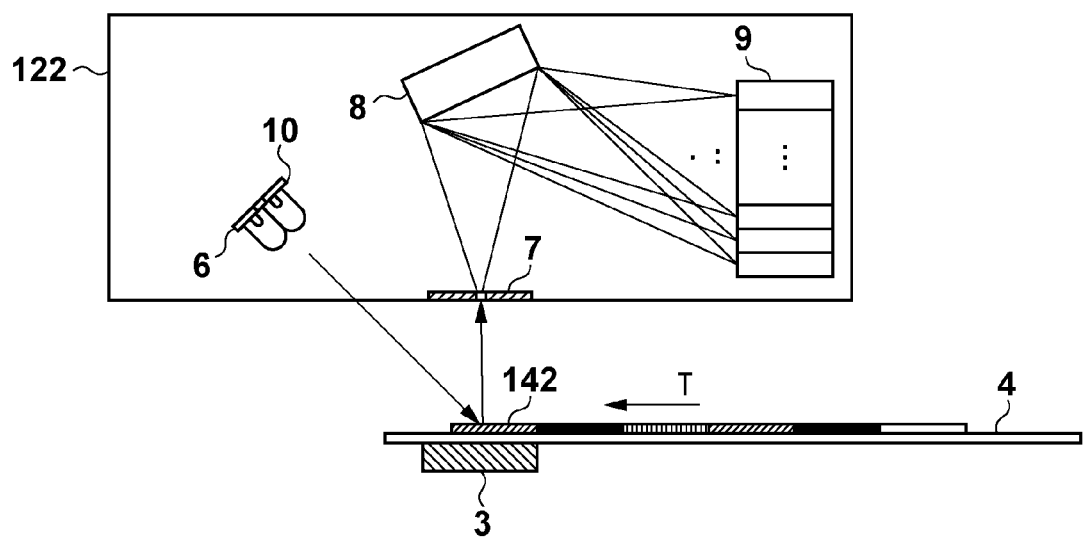
FIGS. 2A and 2B are schematic diagrams illustrating the configuration of a spectral color sensor.

Exemplary embodiments for carrying out the invention will be described in detail hereinafter with reference to the drawings. It should be noted, however, that the dimensions, materials, shapes, and relative dispositions of the constituent elements described in these embodiments are to be changed as appropriate depending on the configurations, conditions, and so on of the apparatus to which the invention is applied, and the scope of the invention is not intended to be limited by the embodiments described hereinafter.

First Embodiment

First, a first embodiment of the present invention will be described. In the first embodiment, a relationship between the detection wavelength properties of a color sensor and the positions of the pixels in the color sensor is measured, and pre-prepared stray light wavelength properties are corrected based on a result of the measurement. Furthermore, a method used in correcting an output when the color sensor measures post-wavelength correction stray light components will be described as well. Hereinafter, the configuration of a printer, an outline of a spectral color sensor, and a stray light correction method will be described in that order.

Printer Configuration

FIG. 1 is a block diagram illustrating an example of the configuration of a printer apparatus, serving as an image forming apparatus according to the present embodiment. Note that a printer apparatus 1 shown here may also be a multi-function peripheral (MFP) that has a printing function. The functional blocks of the printer apparatus 1 can be roughly divided into a controller unit 11 and an engine unit 12. The controller unit 11 includes a color matching unit 111, a calibration unit 112, a calibration LUT generation unit 113, and a color matching LUT generation unit 114. Although a variety of other functional blocks related to image processing are present in the controller unit 11, they are of no direct relation to the present embodiment, and thus descriptions thereof will be omitted.

The color matching unit 111 carries out color adjustment on a job input from a PC using a color matching LUT 1111, such as an ICC profile. In the color adjustment referred to here, a color specified in the job is converted to a color that corresponds to a color handled by an output apparatus. To be more specific, the color adjustment serves to convert device-independent RGB-format image data (RGB data) input from the PC into device-dependent CMYK-format image data (CMYK data). When carrying out this data conversion in the present embodiment, the RGB data is first converted into a device-independent color system such as the L*a*b* color space, and the L*a*b* color space values are then converted once again into CMYK data. The color matching LUT 1111 is used at this time in order to carry out conversion that outputs a color desired by a user. In the image forming apparatus according to the present embodiment, these adjustments are made using values detected by a spectral color sensor 122, described later. Using the spectral color sensor 122 makes it possible to accurately detect properties in which the hue originally differs due to the usage environment of the image forming apparatus, different media, and so on, and carry out the optimal color conversion for individual situations and conditions.

The color matching LUT generation unit 114 generates the color matching LUT 1111 using colorimetric values 1233 in which a spectral output provided by a sensor signal processing unit 123 have been converted into L*a*b* color space values. Specifically, a color matching adjustment pattern generated from known RGB data is formed upon a medium that serves as an output destination by an image forming unit (not shown) provided in the engine unit 12, and the pattern is measured using the spectral color sensor 122. The color matching unit 111 then calculates a shift between the colorimetric values 1233 and desired L*a*b* color space values stored in advance. The color matching LUT generation unit 114 then updates the color matching LUT 1111 for converting the L*a*b* color space values into CMYK data so that desired L*a*b* color space values are obtained.

The calibration unit 112 carries out image correction for maintaining constant printing results (calibration) using a calibration LUT 1121, such as a one-dimensional LUT for each of the CMYK colors. This is because, depending on the state during printing, it may be necessary to specify colors through different data values in order to output the same color, even if the same output apparatus is used. Specifically, in the case where the same CMYK data is printed, the calibration unit 112 fulfills a role of converting the CMYK data received from the color matching unit 111 into a video signal in order to obtain an image that has corresponding values in the L*a*b* color space, and sending that signal to the engine unit 12. The calibration LUT 1121 is thus used in order to carry out correction so that the intended colors are output, in accordance with the state when the image forming apparatus is printing.

The calibration LUT generation unit 113 generates the calibration LUT 1121 using the colorimetric values 1233, in which the spectral output provided by the sensor signal processing unit 123 have been converted into the L*a*b* color space. Specifically, a calibration adjustment pattern generated from known CMYK data is formed upon a medium that serves as an output destination by the image forming unit (not shown) provided in the engine unit 12, and the pattern is measured using the spectral color sensor 122. The calibration LUT generation unit 113 then calculates a shift between the colorimetric values 1233 and desired L*a*b* color space values stored in advance. The calibration LUT generation unit 113 then updates the calibration LUT 1121 for converting the CMYK values into a video signal so that the values correspond to the desired L*a*b* color space. In the present embodiment, the color matching LUT 1111 and the calibration LUT 1121 serve as a color conversion lookup table.

Meanwhile, the engine unit 12 forms a toner image upon a medium such as paper. The engine unit 12 includes a fixing unit 121, the spectral color sensor 122, the sensor signal processing unit 123, and a sensor storage unit 124. Although not shown here, it should be noted that various other functional blocks for forming the toner image on the medium such as paper are present in the engine unit 12 in addition to the fixing unit 121. A flow through which an image is formed by those functional blocks will be described briefly hereinafter. The engine unit 12 includes a photosensitive member (photosensitive drum), an injection charger serving as a primary charging unit, a developer, a toner cartridge, an intermediate transfer member, and a transport member that transports the medium, which serve as the image forming unit (not shown). The primary charging unit forms an electrostatic latent image upon the photosensitive drum through image light formed based on an image signal from the controller unit 11. The developer then forms a visible image by developing the electrostatic latent image using toner from within the toner cartridge. Furthermore, the image upon the photosensitive member that has been changed to a visible image using the toner is then transferred onto the intermediate transfer member. The intermediate transfer member than transfers the image onto a medium upon the transport member, and that image is then fixed by the fixing unit 121. The color measurement patch according to the present invention is also fixed upon a medium through the same type of flow.

The fixing unit 121 includes rollers, belts, and a heat source such as a halogen heater or the like; the fixing unit 121 melts the toner and fixes the toner on the medium (paper or the like) using heat and pressure. In the present embodiment, the fixing unit 121 fixes a toner image formed upon the medium based on image data on which color matching and calibration have been carried out within the controller unit 11.

The spectral color sensor 122 is disposed in a transport path that leads from the fixing unit 121 to a discharge port, and performs color measurement on a patch that has been fixed on a transport medium. Colorimetric data that has been measured by the spectral color sensor 122 is sent to the sensor signal processing unit 123.

The sensor signal processing unit 123 converts the colorimetric data into the colorimetric values 1233 (for example, values in a CIEL*a*b* color space). The sensor signal processing unit 123 also carries out sensor signal processing on a dark current correction unit 1230, a wavelength calibration unit 1231 serving as a first correction unit, and a stray light correction unit 1232 serving as a second correction unit.

Note that when these sensor signal processes are carried out, data that is recorded during assembly adjustment and that is located within the sensor storage unit 124 serving as a storage unit is referred to. Specifically, the data used here is a sensor output (called an "initial white plate output") 1234 for a white reference plate (called a "white plate" hereinafter) that serves as a spectral distribution reference value, an initial stray light amount 1235, and a known spectral reflectivity 1236 for the white plate under a user-evaluated light source. Note that in the equations that are mentioned later, these are expressed as a white plate sensor output $W_{ini}(\lambda)$, an initial stray light amount $F_{ini}(\lambda)$, and a known spectral reflectivity $W(\lambda)$ for the white plate, respectively. Based on these pieces of data, the colorimetric values 1233, in which wavelength shifts and stray light have been corrected, are sent to the calibration LUT generation unit 113 and the color matching LUT generation unit 114.

In addition, in the present embodiment, the printer apparatus 1 includes a CPU that controls various types of processes and a storage unit (a ROM, a RAM, or the like) in which programs and the like that are executed by the CPU are stored. The various constituent elements of the controller unit 11, the sensor signal processing unit 123 of the engine unit 12, and so on are controlled by the CPU executing programs. In addition, the storage unit such as a ROM or a RAM is used as the sensor storage unit 124 within the engine unit 12. Likewise, the color matching LUT 1111 generated by the color matching LUT generation unit 114, the calibration LUT 1121 generated by the calibration LUT generation unit 113, and so on are also stored in the storage unit such as a RAM. Although the various processing units according to the present embodiment have been described as being realized by the CPU executing programs in which the processes are defined, it should be noted that the configuration may be such that these units are realized through hardware circuitry such as ASICs or the like.

The printer apparatus 1 according to the present embodiment outputs a patch for calibration to a medium before or during the execution of a print job, and measures the patch using the included spectral color sensor 122. The printer apparatus 1 then creates/updates the calibration LUT 1121 based on the measured values. Through this, the printer apparatus 1 maintains a constant color reproducibility.

In addition, the printer apparatus 1 according to the present embodiment outputs a patch for color matching to a medium before executing a print job, and measures the patch using the included spectral color sensor 122. The printer apparatus 1 then creates/updates the color matching LUT 1111 based on the color measurement values. Through this, the printer apparatus 1 adjusts differences in tints arising from printer apparatus to printer apparatus. The timing at which the calibration LUT 1121 and the color matching LUT 1111 are updated can be determined based on details set in advance. For example, the printer apparatus 1 can update the calibration LUT 1121 and the color matching LUT 1111 each time a print job is received.

Outline of Spectral Color Sensor

Figure 2B:
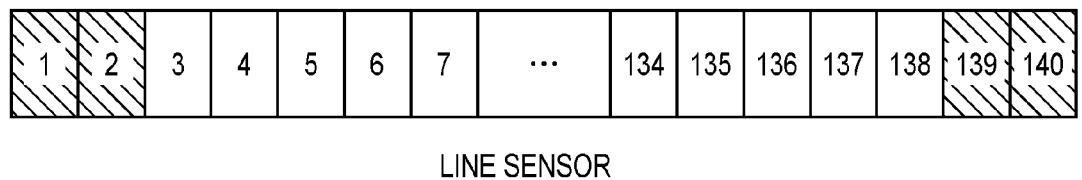

Next, the configuration of the spectral color sensor according to the present embodiment will be described. FIG. 2A is a schematic diagram illustrating the configuration of the spectral color sensor. Although a line sensor is used as the sensor in the present embodiment, it should be noted that the sensor is not limited thereto. For example, the present invention may be carried out using an area sensor. FIG. 2B is a detailed diagram illustrating a charge accumulation-type line sensor 9 serving as a light detection element provided in the spectral color sensor 122. Each pixel is configured, for example, of a high-current gain transistor capable of detecting light, a capacitor that is charged by the output of the transistor, and so on, and the charged voltage (accumulated voltage) of the capacitor serves as the sensor output. The spectral color sensor 122 includes a white LED 6 having an emission wavelength distribution that spans the entire range of visible light. A white plate 3, as mentioned before, is disposed opposite to the spectral color sensor 122, and also functions as a paper transport guide. A colorimetric patch 142 formed upon a medium 4 is transported between the spectral color sensor 122 and the white plate 3. Light irradiated from the white LED 6, which serves as a light source, is incident on the medium 4 or on the colorimetric patch 142 formed on the medium 4 at a 45° angle relative thereto, is reflected diffusely, and spreads upward. After the reflected light has been constricted by a slit 7, it hits a diffraction grating 8, and is split into individual wavelengths. The spectrum resulting from the light being split into the individual wavelengths enters the line sensor 9. As shown in FIG. 2B, the line sensor 9 according to the present embodiment is configured of 140 pixels, and the numbers shown in FIG. 2B will serve as the addresses of the pixels hereafter.

In the line sensor 9, the total of 136 pixels from addresses 3 through 138 corresponds to a region in which two excess pixels have been provided in addition to 134 pixels that are necessary for detecting visible light, whose wavelength ranges from approximately 350 nm to approximately 750 nm, in 3 nm units. The total of four pixels corresponding to addresses 1, 2, 139, and 140 are dark pixels whose surfaces are blocked and that are used for correcting dark output. Here, "dark output" refers to outputs from capacitors charged by dark current arising in the dark pixels. The spectrum that has been divided into individual wavelengths by the diffraction grating 8 is projected onto each of the pixels. The spectral values of the measurement target (also referred to as the "spectral intensity" or "spectral sensitivity") are obtained by using a 16-bit AD converter (not shown) to perform AD conversion on the output voltages of each pixel in the line sensor 9 that have been accumulated over a predetermined amount of time. Then, through a method that will be described later, multiple correction processes are carried out, after which a spectral reflectivity is calculated every 10 nm from 380 nm to 730 nm based on the results of the corrections, ultimately converting the values into chromaticity values in a color space such as CIEL*a*b*. In addition to the white LED 6 used for measurement, the spectral color sensor 122 according to the present embodiment also includes a red LED 10 that serves as a light source for carrying out wavelength calibration, described later, within the apparatus.

Stray Light Correction Method

Figure 3:
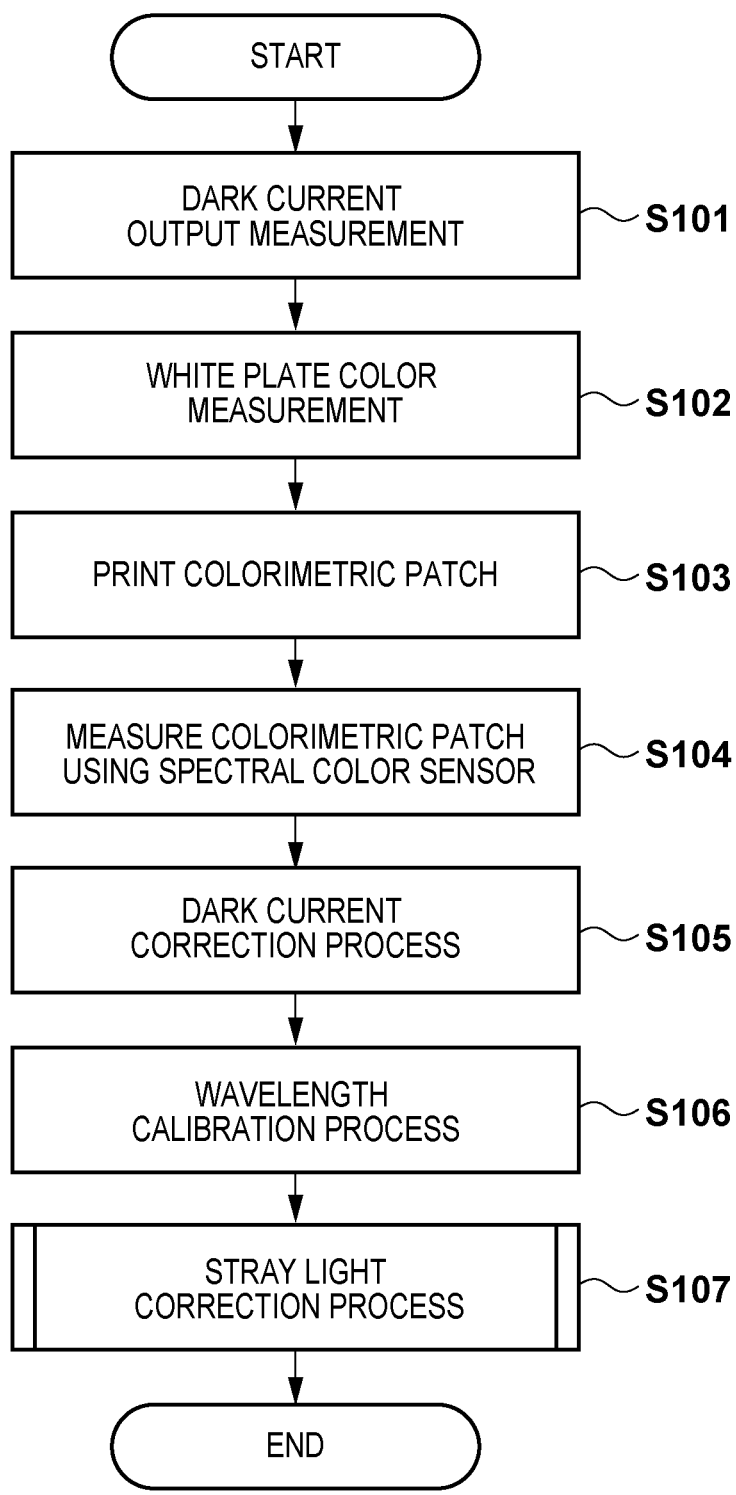
FIG. 3 is a flowchart illustrating color measurement using a spectral color sensor.

Next, a stray light correction method of the spectral color sensor according to the present embodiment will be described. FIG. 3 is a flowchart illustrating color measurement performed by the printer apparatus 1 using the spectral color sensor 122 according to the present embodiment.

First, in S101, the printer apparatus 1 uses the spectral color sensor 122 to measure dark output. The sensor signal processing unit 123 obtains dark outputs of each pixel in the line sensor 9, which serves as a light detection element. To describe this dark output measurement in more detail, the spectral color sensor 122 obtains a sensor output for the same accumulation time as when measuring the patch, but in a state in which the light source is extinguished. Note that the dark output measurement may correct the output of dark pixels for the purpose of dark output correction, as described earlier. Hereinafter, the dark output based on dark current in the pixels i (i=1, 2, and so on up to 140) is expressed as Ndrk(i).

In S102, the printer apparatus 1 uses the spectral color sensor 122 to measure the white plate 3 disposed opposite thereto. The controller unit 11 finds a spectral reflectivity $O(\lambda)$ of the measurement target by multiplying the known white plate spectral reflectivity $W(\lambda)$ with the ratio between the spectral value $W_{sg}(\lambda)$ of white light on the white plate and the spectral value $P_{sg}(\lambda)$ of the measurement target such as the patch. Specifically, the controller unit 11 calculates the spectral reflectivity $O(\lambda)$ through the following Equation 1. According to Equation 1, the correct spectral reflectivity can be calculated regardless of the irradiation conditions of the white LED 6, such as, for example, the amount of light the white plate 3 is irradiated with by the white LED 6 dropping due to the white LED 6 being soiled.

$$O(\lambda) = \{P_{sg}(\lambda)/W_{sg}(\lambda)\} \times W(\lambda) \quad \text{Equation 1}$$

Meanwhile, measuring the white plate 3 is also carried out in order to execute the wavelength calibration processing, mentioned later. Hereinafter, the white plate sensor output in the pixels i (i=1, 2, and so on up to 140) is expressed as $W_{sns}(i)$.

Figure 4:
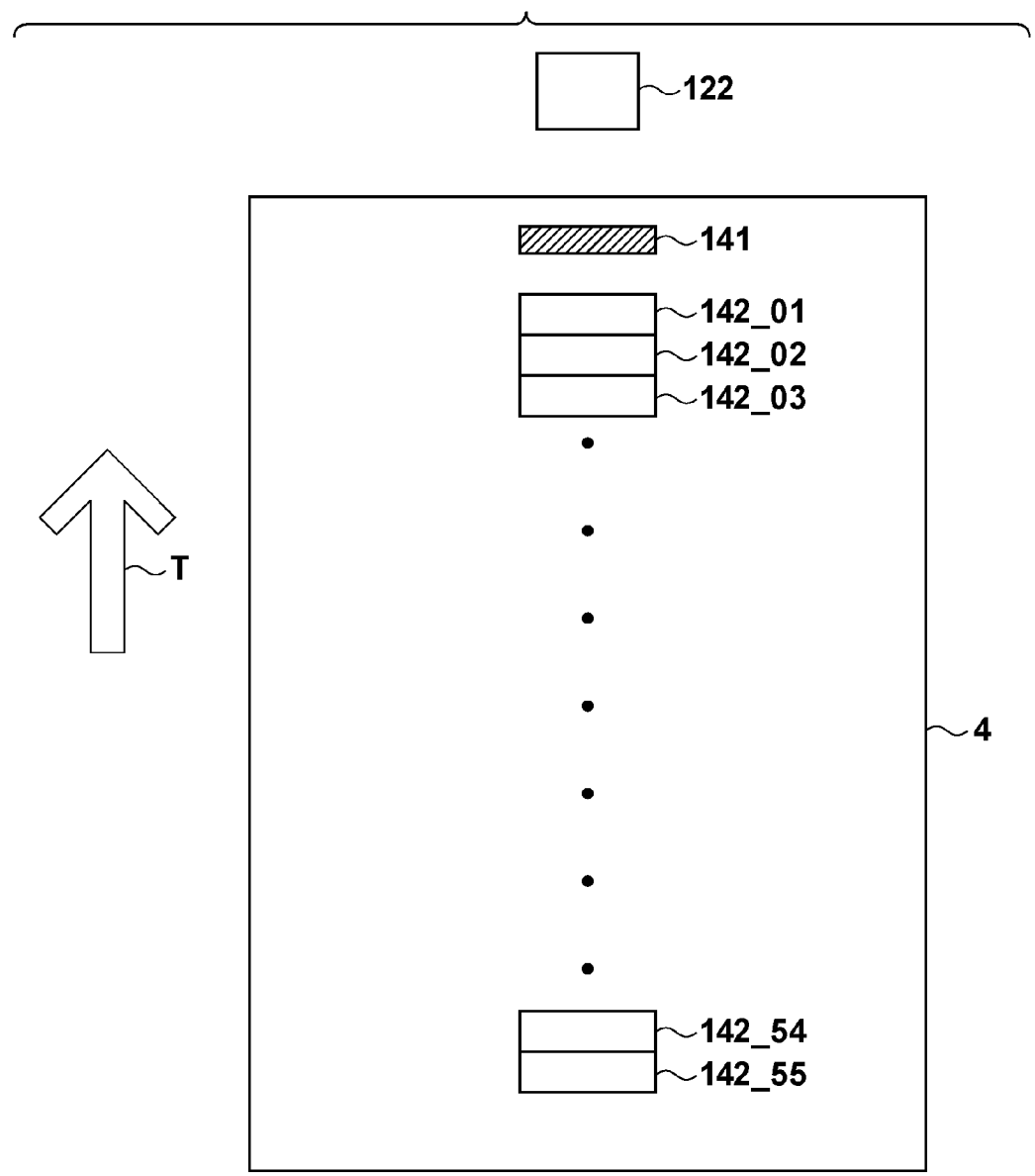
FIG. 4 is a diagram illustrating an example of a colorimetric patch.

In S103, the image forming unit (the aforementioned photosensitive drum and so on) and the fixing unit 121 that carry out image formation in the engine unit 12 print the colorimetric patch on the medium 4. FIG. 4 is an example of the colorimetric patch used in the present embodiment. The medium 4 is transported in the direction indicated by the arrow T, and the colorimetric patch is printed at a position that is opposite to the spectral color sensor 122. To describe this in more detail, the colorimetric patch according to the present embodiment is printed at a predetermined timing before the printer apparatus 1 executes a print job or while the printer apparatus 1 is executing a print job. Image data sent from the PC undergoes predetermined processing in the controller unit 11, and is then sent to the engine unit 12. Then, after being fixed by the fixing unit 121 in the engine unit 12, the medium 4 is sent to a color measurement position in which the spectral color sensor 122 is disposed.

In S104, the printer apparatus 1 measures the colorimetric patch printed on the medium 4 in S103 using the spectral color sensor 122. The sensor signal processing unit 123 then obtains outputs of each pixel in the line sensor 9, which serves as a light detection element. At this time, the spectral color sensor 122 measures 55 color patches, or colorimetric patches 142_01 through 142_55, in a predetermined amount of time, using the timing at which a solid black patch 141 on the medium 4 shown in FIG. 4 is detected. The "predetermined amount of time" mentioned here is defined by the transport speed of the medium 4, the size of the patches, and so on. Hereinafter, the sensor output of the pixels i (i=1, 2, and so on up to 140) in the jth (j=01, 02, and so on up to 55) colorimetric patch is expressed as $S_{out}(j,i)$.

In S105, the dark current correction unit 1230 of the sensor signal processing unit 123 uses the dark current component $N_{drk}(i)$ obtained in S101 to perform a dark current correction process on the sensor output $W_{sns}(i)$ for the white plate 3 and the sensor output $S_{out}(j,i)$ for the colorimetric patch. In this step, assuming that the output of the pixel i for the white plate after the correction process is expressed as tmp1(i) and the output of the pixel i for the colorimetric patch whose patch number is j is expressed as tmp2(j,i), tmp1(i) and tmp2(j,i) are calculated using the following Equation 2. In other words, the dark current component is removed from the white plate or colorimetric patch sensor output through the following Equation 2.

(White Plate)

$$tmp1(i)=W_{sns}(i)-N_{drk}(i)$$

(Colorimetric Patch)

$$tmp2(j,i)=S_{out}(j,i)-N_{drk}(i) \quad \text{Equation 2}$$

In S106, the wavelength calibration unit 1231 of the sensor signal processing unit 123 carries out the wavelength calibration processing that updates the correspondence relationship between the pixels in the line sensor 9 and the wavelengths. This process is executed because, as described earlier in the related art, a high colorimetric accuracy cannot be obtained if a spectral color sensor that employs a line sensor, as is the case in the present embodiment, does not have an accurately-corresponding relationship between the pixels and the wavelengths of the reflected light. Meanwhile, in the case where the printer apparatus includes the spectral color sensor, the optical system of the sensor will change due to warping of the sensor body caused by a rise in the temperature within the printer apparatus 1, differences in installation environments, the passage of time, and so on, and due to thermal expansion of the diffraction grating. Accordingly, the pixel-to-wavelength relationship in the line sensor certified at the time of assembly adjustment will shift from the relationship occurring during printing. In other words, changes will occur in the correspondence relationship between the projection positions (pixels) in the line sensor 9 and the wavelengths due to various factors arising within the printer apparatus.

Figure 5A:
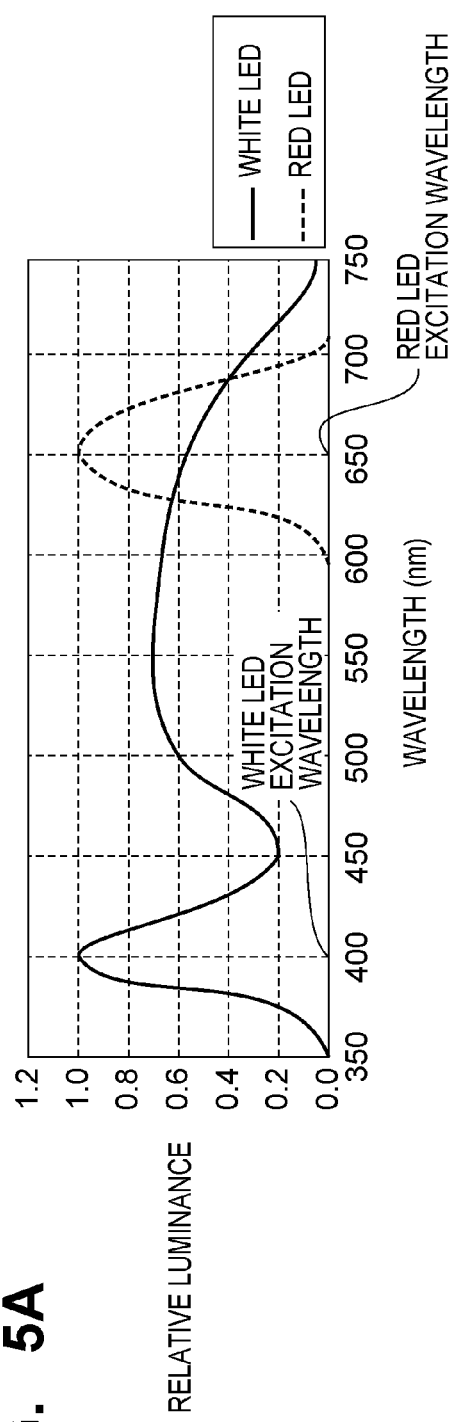
FIGS. 5A and 5B are diagrams illustrating a wavelength calibration method for a spectral color sensor according to a first embodiment.
Figure 5B:
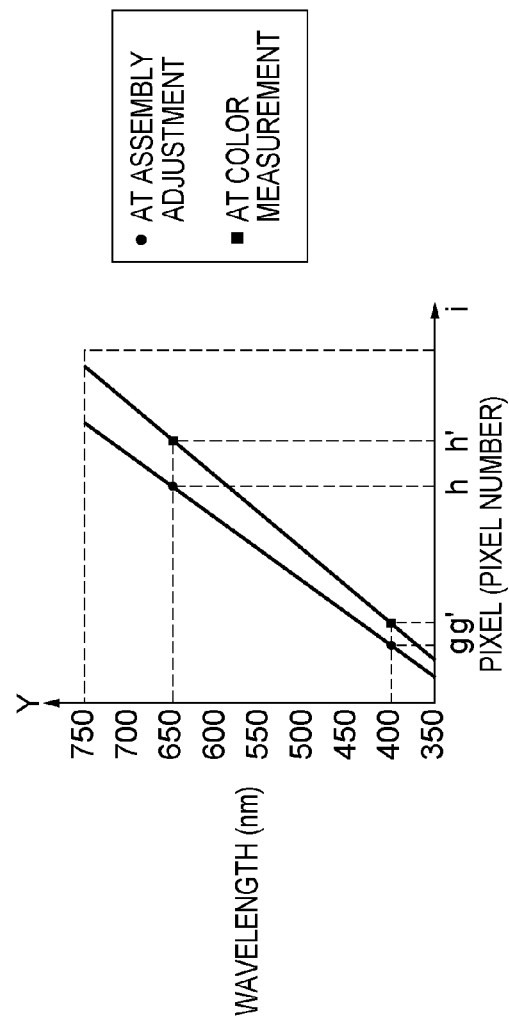

The wavelength calibration processing according to the present embodiment is as follows. FIGS. 5A and 5B are diagrams illustrating the wavelength calibration method of the spectral color sensor according to the present embodiment. FIG. 5A is a diagram illustrating correspondences between the wavelengths and relative luminances of the white LED 6 provided in the spectral color sensor 122 and the red LED 10 used for wavelength calibration according to the present embodiment. Here, the vertical axis represents the relative luminance, and the horizontal axis represents the wavelength. Meanwhile, the maximum value of a luminance in a wavelength (that is, an excitation wavelength) is taken as 1.0, and relative values for that maximum value (that is, relative luminances) are indicated for each wavelength. The excitation wavelength of the white LED 6 (the peak wavelength of the solid line in FIG. 5A) is 400.0 nm, whereas the excitation wavelength of the red LED 10 (the peak wavelength of the dotted line in FIG. 5A) is 650.0 nm. Assuming that these two excitation wavelengths do not change after assembly, the two light sources are lit in sequence with each color measurement, and which pixel in the line sensor 9 the centers of the two excitation wavelengths appear in is detected.

In reality, the white plate 3 that is positioned opposite to the spectral color sensor 122 has a unique reflectance in the visible light range, and thus the pixel in which the center of the excitation wavelength appears is detected based on the tmp1(i) on which the dark current correction was carried out from the reflected light of the white plate 3. FIG. 5B illustrates the pixel-to-wavelength relationships for the two excitation wavelengths and the other wavelengths, at the time of assembly adjustment and at the time of measurement following the assembly. Here, the vertical axis represents the wavelength, and the horizontal axis represents the pixel. For assembly adjustment, a detected pixel g of the white LED 6 at an excitation wavelength of 400.0 nm and a detected pixel h of the red LED 10 at an excitation wavelength of 650.0 nm are indicated by black circles. Meanwhile, four-color measurement, a detected pixel g' of the white LED 6 at an excitation wavelength of 400.0 nm and a detected pixel h' of the red LED 10 at an excitation wavelength of 650.0 nm are indicated by black squares. As can be seen from FIG. 5B, the pixel-to-wavelength relationships aside from the two excitation wavelengths are found through linear interpolation based on the relationships between the detected wavelengths and pixels. Specifically, the wavelength $Y(\lambda)$ of a pixel i (ith pixel) in the line sensor 9 at, for example, the time of color measurement is found through the following Equation 3.

$$Y(\lambda)=((650-400)/(h'-g'))\times(i-g')+400 \quad \text{Equation 3}$$

Then, the wavelength calibration unit 1231 holds the relationship indicated in Equation 3 as a wavelength conversion lookup table (called a "wavelength conversion LUT" hereinafter), and corrects the sensor output values of each patch.

Figure 6:
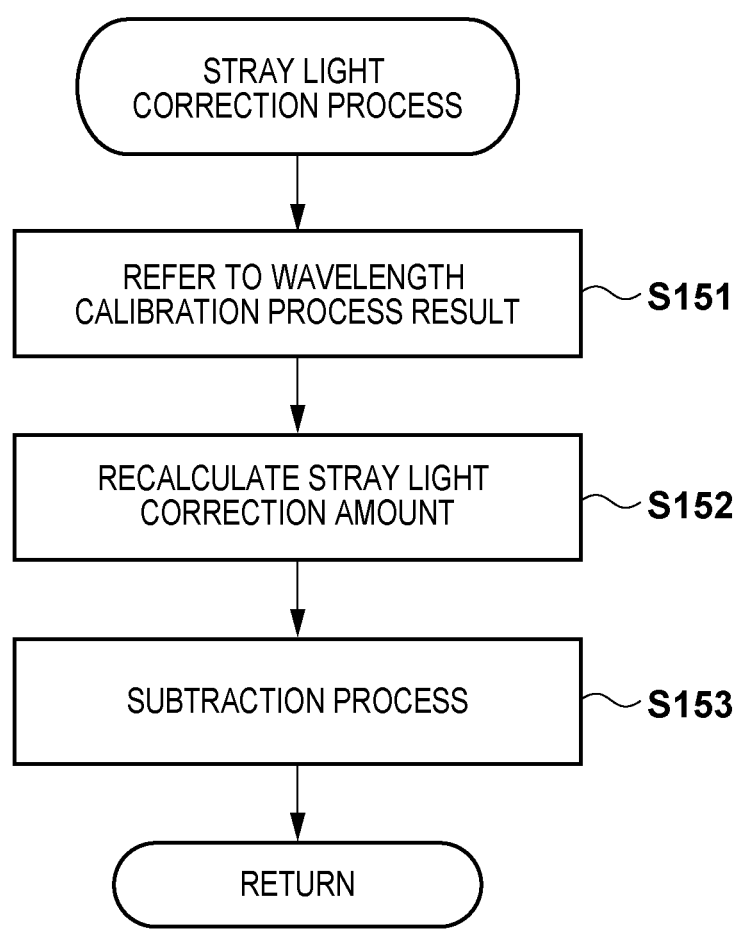
FIG. 6 is a flowchart illustrating a stray light correction process according to the first embodiment.

In S107, the stray light correction process is carried out. This process is carried out by the stray light correction unit 1232 of the sensor signal processing unit 123. FIG. 6 is a flowchart illustrating the stray light correction process. Note that a change in the stray light correction amount for each wavelength occurring concurrently with a change in the pixel-to-wavelength relationship of the spectral color sensor 122 arises due to light from the white LED 6, which serves as a light source, entering from the same slit 7 as both reflected light from the patch and stray light.

In S151, the stray light correction unit 1232 refers to the wavelength calibration processing results (this corresponds to FIG. 5B) described in S106. In S152, the stray light correction unit 1232 recalculates the stray light amount measured during assembly adjustment in accordance with the latest pixel-to-wavelength relationship, based on the wavelength calibration processing results referred to in S151.

FIGS. 7A through 7D are diagrams illustrating a method for recalculating the stray light amount according to the present embodiment. In both FIG. 7A and FIG. 7B, the vertical axis represents a relative output value for the peak spectral value of the white plate 3, and the horizontal axis represents a wavelength.

Figure 7A:
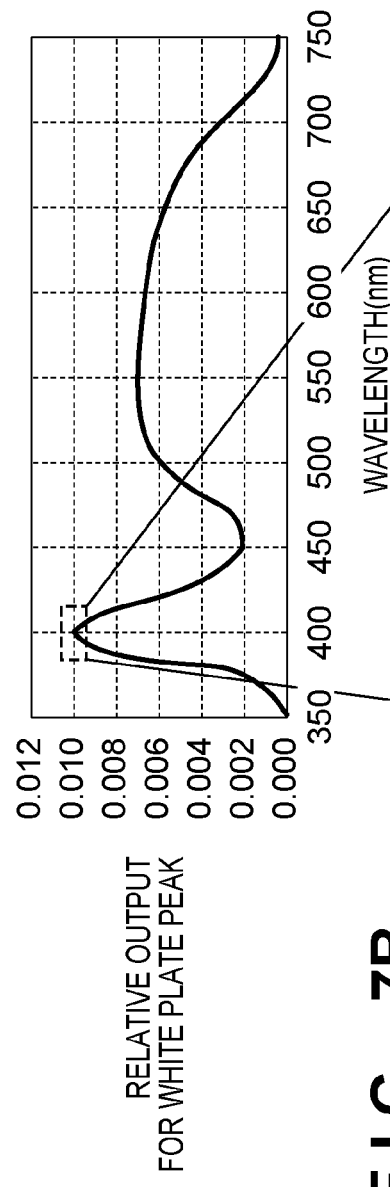
Figure 7B:
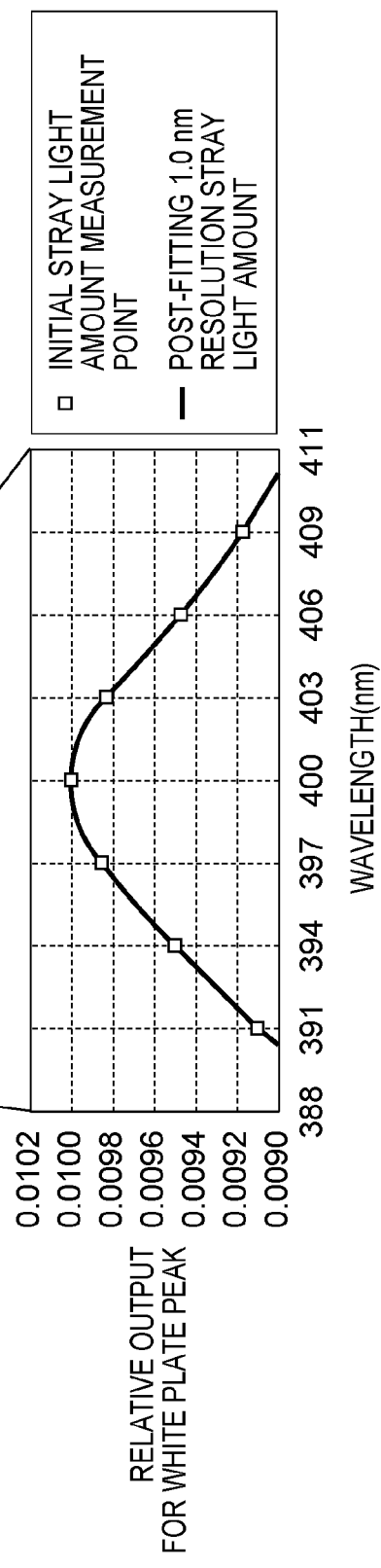

FIG. 7A represents the initial stray light amount 1235 ($F_{ini}(\lambda)$) stored in the sensor storage unit 124, and stray light amounts are stored every 1.0 nm. FIG. 7B is an enlargement in which part of the wavelength range shown in FIG. 7A has been cut out. In the present embodiment, stray light amounts are used for every 1.0 nm because doing so makes it possible to realize results in which the stray light amount can be accurately estimated, even in the case where the pixel-to-wavelength relationship has changed due to the presence of information that has a higher resolution than approximately 3 nm, which is the wavelength resolution of the aforementioned line sensor 9. Note that the resolution is not limited to this value as long as the aforementioned effects can be realized. In the present embodiment, stray light amount measurement values for approximately every 3 nm occurring at the time of assembly adjustment (the white boxes in FIG. 7B) are fitted to a cubic spline function, and wavelength-relative outputs for a resolution of 1 nm (the solid line in FIG. 7B) are calculated. Then, $F_{ini}(\lambda)$ is calculated based on relative output values that have further been found, and is then stored.

In the case where, for example, the pixel-to-wavelength relationship has changed between the time of assembly adjustment and a measurement that is carried out a predetermined amount of time thereafter, as shown in FIG. 7C, data for the wavelength that is closest to the corrected wavelength $Y(\lambda)$ for the pixel i found through Equation 3 is selected from $F_{ini}(\lambda)$, as shown in FIG. 7D. For example, consider a case in which the pixel-to-wavelength relationship at the time of assembly adjustment shown in FIG. 7C, which is pixel 16:wavelength 395, has changed to a relationship pixel 16:wavelength 395.8 at the time of measurement. In this case, the wavelength is closest to 396, and thus $F_a(0.00975)$ is selected as the corresponding stray light amount. Note that "$F_a(0.00975)$" indicates a stray light amount corresponding to a relative output of 0.00975. The stray light amount of the recalculated wavelength for the pixel i selected in this manner is then handled as F(i) thereafter.

In S153, the stray light correction unit 1232 carries out a process for subtracting the stray light correction amount found in S152. Specifically, the stray light correction unit 1232 subtracts the stray light component F(i) from tmp1(i) and tmp2(j,i) resulting from removing the dark current components from the sensor outputs of the white plate and the colorimetric patch. At this time, the wavelength $\lambda(i)$ is associated with the pixel i based on the aforementioned wavelength conversion LUT, and thus the spectral values of the white plate and the jth colorimetric patch at the wavelength $\lambda(i)$ for the pixel i, from which the noise components have been removed, are obtained through the following Equation 4 as $W_{sg}(\lambda(i))$ and $P_{sg}(\lambda(i))$.

(White Plate)            Equation 4

$$W_{sg}(\lambda(i)) = tmp1(i) - F(i)$$
$$= W_{sns}(i) - N_{drk}(i) - F(i)$$

(jth Colorimetric Patch)

$$P_{sg}(j, \lambda(i)) = tmp2(j, i) - F(i)$$
$$= S_{out}(j, i) - N_{drk}(i) - F(i)$$

Then, the sensor signal processing unit 123 ultimately uses the white plate spectral reflectivity $W(\lambda)$ to calculate $O(j,\lambda)$, which is the spectral reflectivity for the wavelength $\lambda$ and the jth colorimetric patch, through the following Equation 5, in the same manner as with Equation 1.

$$O(j,\lambda) = (P_{sg}(j,\lambda)/W_{sg}(\lambda)) \times W(\lambda)$$     Equation 5

As described thus far, according to the present embodiment, when the pixel-to-wavelength relationship in the line sensor 9 that configures the spectral color sensor 122 has changed, the stray light is subtracted after first carrying out wavelength calibration on the stray light stored at the time of assembly adjustment, thus obtaining an accurate spectral distribution from a patch. This makes it possible to carry out accurate color measurement using a spectral color sensor whose light detection element is an area sensor, without directly measuring stray light components in each measurements using a light absorbing body or the like.

Although a white LED is described as being used as the white light source of the spectral color sensor 122 in the present embodiment, it should be noted that, for example, a tungsten light, three RGB LEDs, or the like may be used. Furthermore, the wavelength calibration method may be realized through prior art, such as Japanese Patent Laid-Open No. 2008-185565 mentioned in the aforementioned related art. Furthermore, although the present embodiment describes the patches measured by the spectral color sensor as being sent from a PC to the printer apparatus, the patches may come from another input apparatus aside from a PC in the case where the printer apparatus is provided with an operation panel or the like.

Second Embodiment

Next, a second embodiment of the present invention will be described. The first embodiment describes an example in which an accurate signal is obtained by estimating changes in the wavelength direction of stray light based on the output of the spectral color sensor 122 provided in the printer apparatus 1. As opposed to this, the present embodiment describes an example in which an even more accurate signal is obtained by estimating changes in the intensity direction, or in other words, in the stray light amount itself, in addition to changes in the wavelength direction. Accordingly, the present embodiment and the first embodiment differ primarily in that in the stray light amount correction, the intensity direction is corrected in addition to the wavelength direction. Accordingly, in the present embodiment, the color measurement flow and the like are the same as in the first embodiment; elements that are the same will be given the same reference numerals as shown in FIG. 1 through FIGS. 7A-D, and detailed descriptions thereof will be omitted.

Stray Light Correction Method

It can be assumed that the spectral color sensor 122, which includes a light source, will experience a drop in its light amount as time passes. The white LED 6, which serves as the light source employed in the present embodiment, is normally configured with a scintillator is disposed upon a light-emitting element having an excitation wavelength on the short-wavelength side, thus increasing the output in the red, green, and yellow wavelength ranges. However, the photoenhancement effects of the scintillator decrease over time. In such a case, the amount of light emitted on the long-wavelength side will decrease over time. The amount of stray light on the long-wavelength side will also be dampened as a result. It is a characteristic of the present embodiment to carry out stray light amount correction based on the idea of maintaining the same intensity ratio of the initial stray light amount $F_{ini}(\lambda)$ relative to the white plate sensor output $W_{ini}(\lambda)$ at the time of assembly adjustment in the wavelength $\lambda$. In other words, a process is carried out based on the assumption that a constant relative relationship is present between the sensor output value for the measurement target and the stray light amount.

Processing Flow

Figure 8:
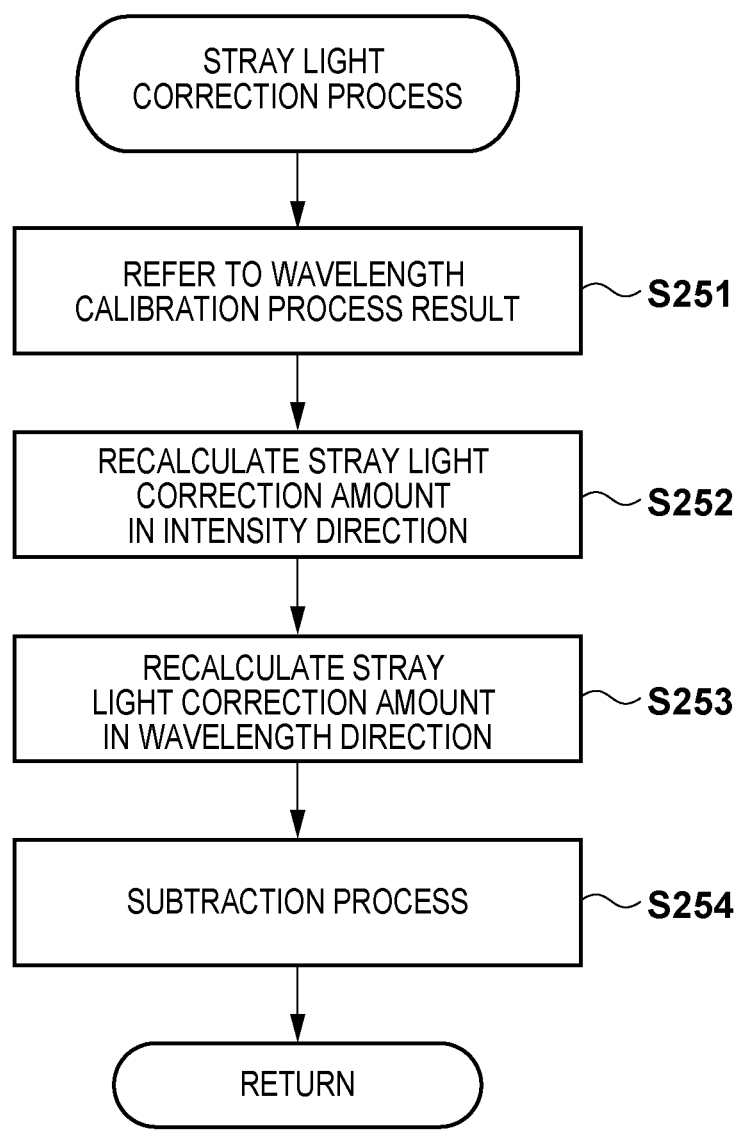
FIG. 8 is a flowchart illustrating an in-apparatus stray light correction process according to a second embodiment.

FIG. 8 is a flowchart illustrating the stray light correction process according to the present embodiment. A stray light correction process for the intensity direction, which is a characteristic of the present embodiment, will be described using this flowchart. This process is carried out by the stray light correction unit 1232 of the sensor signal processing unit 123.

S251 is the same process as S151 in the color measurement flow according to the first embodiment and shown in FIG. 6, and thus descriptions thereof will be omitted.

Figure 9A:
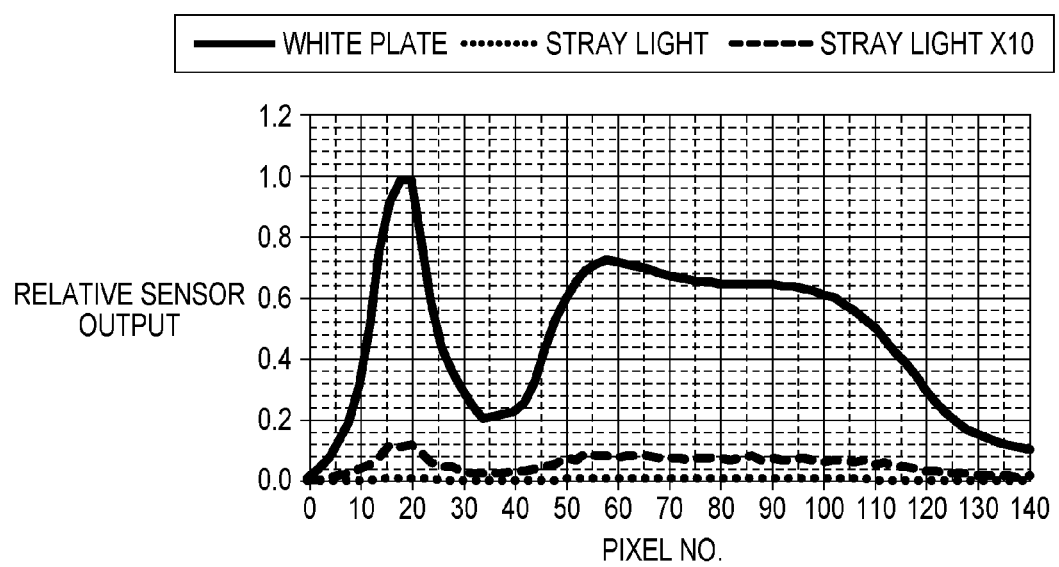
FIGS. 9A and 9B are diagrams illustrating a relationship between relative sensor outputs when taking a color measurement for a white plate and relative sensor outputs for in-apparatus stray light components at the time of assembly adjustment for a spectral color sensor according to the second embodiment.
Figure 9B:
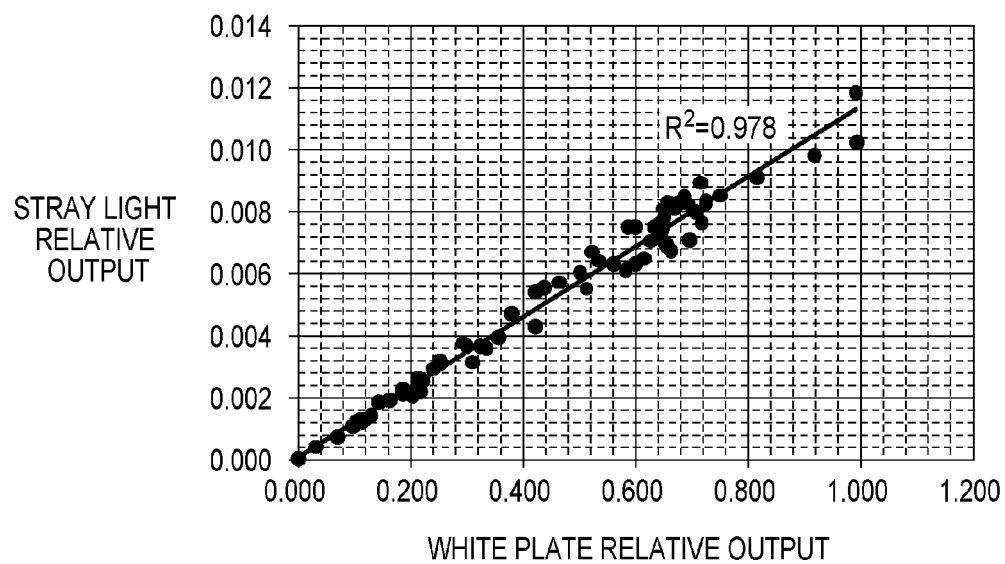

In S252, the stray light correction unit 1232 recalculates the stray light correction amount of the intensity direction. FIGS. 9A and 9B are diagrams illustrating relationships between the relative sensor output $W_{ini}(\lambda)$ and the relative sensor output $F_{ini}(\lambda)$ of the stray light component when measuring the white plate 3 using the spectral color sensor 122 according to the present embodiment at the time of assembly adjustment. Note that the data shown here is data in which the dark current components have already been removed from the white plate and the stray light. FIG. 9A illustrates the relative outputs for each of the pixels in the line sensor 9. Here, the vertical axis represents the relative sensor output values, whereas the horizontal axis represents the pixels. Note that the stray light component is an output that is less than approximately 1/100 of the white plate output, and because that size is difficult to see, data that has been magnified 10 times is also shown along therewith. Meanwhile, FIG. 9B illustrates a relationship between the intensities of the white plate and the stray light in each wavelength output shown in FIG. 9A. Here, the vertical axis represents the stray light relative sensor output values, whereas the horizontal axis represents the white plate relative sensor output values. As can be seen from FIG. 9B, there is an extremely strong correlation between the output when the white plate is measured by the spectral color sensor 122 and the output of the stray light. This is because, as described in the first embodiment, the source of the stray light is the light source of the spectral color sensor 122.

Figure 10:
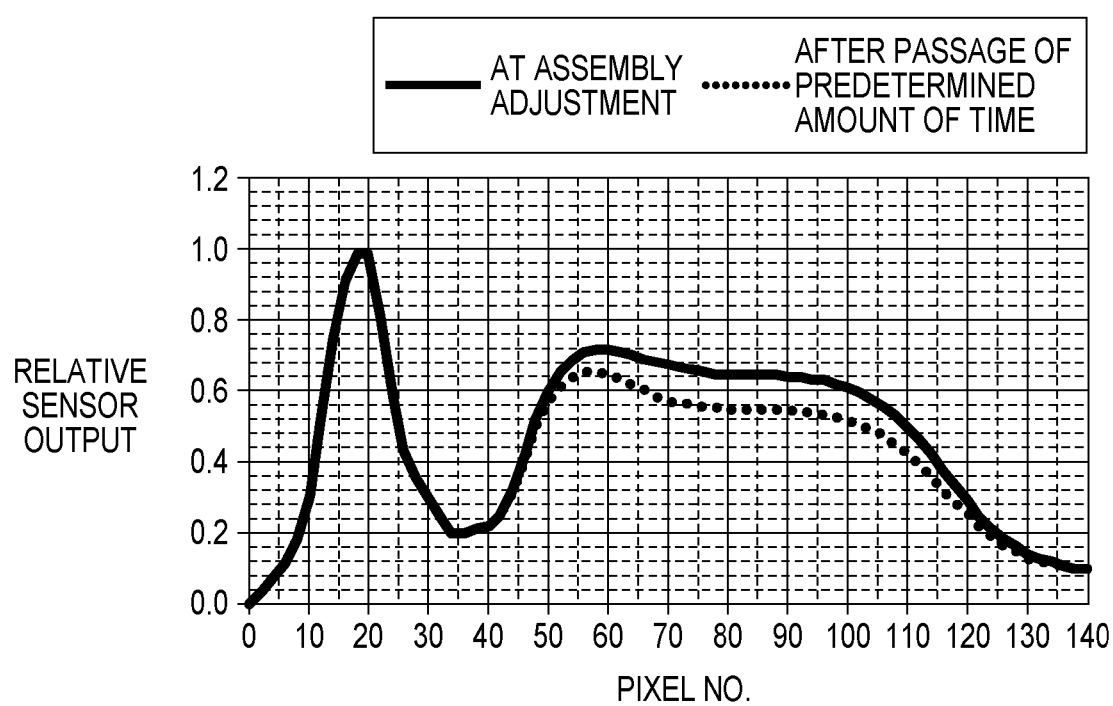
FIG. 10 is a diagram illustrating an example of a white plate sensor output during assembly adjustment and after use.

FIG. 10 illustrates an example of sensor outputs of the white plate 3 at the time of assembly adjustment (the solid line) and when a measurement has been taken after the passage of a predetermined amount of time (the broken line).

Here, the vertical axis represents the relative sensor output values, whereas the horizontal axis represents the pixels. In the example shown in FIG. 10, the sensor output of the white plate 3 changes due to the passage of time from around the 50th pixel to around the 130th pixel. In such a case, it can be assumed that the amount of stray light will also change as a result of the change in the output of the white plate 3. In the present embodiment, the change in the intensity of the stray light amount is corrected using the initial white plate output 1234 ($W_{ini}(\lambda)$) and the initial stray light amount 1235 ($F_{ini}(\lambda)$) stored within the sensor storage unit 124 at the time of assembly adjustment. Assuming that the post-intensity correction stray light amount for a wavelength $\lambda$ is taken as $F_p(\lambda)$, $F_p(\lambda)$ is found through the following Equation 6.

$$F_p(\lambda) = F_{ini}(\lambda) \times tmp1(i) / W_{ini}(\lambda) \qquad \text{Equation 6}$$

In Equation 6, $tmp1(i) = W_{sns}(i) - N_{drk}(i)$.

As described above, Equation 6 assumes that the same intensity ratio of the initial stray light amount $F_{ini}(\lambda)$ relative to the white plate sensor output $W_{ini}(\lambda)$ at the time of assembly adjustment in a wavelength $\lambda$ is maintained. Based on this, Equation 6 indicates that the stray light amount is changed by an amount equivalent to the change from the initial white plate output.

In S253, the stray light correction unit 1232 carries out the stray light correction process for the wavelength direction described in S152 in the first embodiment. However, although the initial stray light amount 1235 ($F_{ini}(\lambda)$) is used in the first embodiment, the present embodiment differs in that $F_p(\lambda)$ found in S252 is used.

In S254, the stray light correction unit 1232 carries out a process for subtracting the stray light correction amount from the new stray light component obtained in S253, in the same manner as S153 in the first embodiment.

Through the method described thus far, it is possible to find an accurate stray light component even in the case where the output of the light source in the spectral color sensor 122, which is the source of the stray light, has fluctuated, without directly measuring stray light components in each measurement using a light absorbing body or the like; it is thus possible to perform an even more accurate color measurement.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e. g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-157121, filed Jul. 15, 2011, which is hereby incorporated by reference herein in its entirety.

What is claimed is:

1. A spectral color sensor comprising:
a spectroscopic unit configured to irradiate a measurement target with light from a light source and disperses reflected light from the measurement target;
a light detection element that comprises a plurality of pixels and detects the dispersed light from the reflected light;
a storage unit configured to store (i) a first correspondence relationship between the plurality of pixels and a wavelength of a dispersed light received by each of the plurality of pixels, (ii) a second correspondence relationship between the plurality of pixels and a stray light component received by each of the plurality of pixels, wherein the stray light component is, of light which is irradiated from the light source and is detected by the light detection element, light which is not the reflected light from the measurement target, and (iii) a third correspondence relationship between the plurality of pixels and a dark output which is output from the light detection element in a state that the light source does not emit a light;
a first correction unit configured to, correct the first correspondence relationship between the plurality of pixels and a wavelength of a dispersed light received by each of the plurality of pixels, stored in the storage unit, depending on, of the plurality of pixels, a pixel which receives a specific wavelength of the dispersed light; and
a second correction unit configured to, in accordance with a correction result by the first correction unit, correct the second correspondence relationship between the plurality of pixels and the stray light component received by each of the plurality of pixels stored in the storage unit,
wherein the second correction unit does not correct the third correspondence relationship, but corrects the second correspondence relationship.

2. The spectral color sensor according to claim 1,
wherein the storage unit further stores a relative relationship between a sensor output for a reference plate that serves as a reference value and the stray light component; and
the second correction unit further corrects the intensity of the stray light component stored in the storage unit using a measurement result when performing color measurement on the reference plate and the relative relationship stored in the storage unit.

3. The spectral color sensor according to claim 2, further comprising:
a calculation unit configured to correct the sensor output for the measurement target and to calculate a spectral reflectivity or a chromaticity of the measurement target based on the result of the second correction unit correcting the stray light component of the measurement target.

4. The spectral color sensor according to claim 1, further comprising:
a calculation unit configured to correct the sensor output for the measurement target and to calculate a spectral reflectivity or a chromaticity of the measurement target based on the result of the second correction unit correcting the stray light component of the measurement target.

5. The spectral color sensor according to claim 1,
wherein a detection result detected by the light detection element is corrected based on the result of the correction performed by the second correction unit.

6. The spectral color sensor according to claim 1, wherein the stray light component is measured when irradiating, with light from the light source, a measurement target for inhibiting the reflected light.

7. An image forming apparatus comprising:
an image forming unit configured to form an image;
a spectroscopic unit configured to irradiate a measurement target with light from a light source and disperses reflected light from the measurement target;
a light detection element that comprises a plurality of pixels and is configured to detect the dispersed light from the reflected light;
a storage unit configured to store (i) a first correspondence relationship between the plurality of pixels and a wavelength of a dispersed light received by each of the plurality of pixels, (ii) a second correspondence relationship between the plurality of pixels and a stray light component received by each of the plurality of pixels, wherein the stray light component is, of light which is irradiated from the light source and is detected by the light detection element, light which is not the reflected light from the measurement target, and (iii) a third correspondence relationship between the plurality of pixels and dark output which is output from the light detection element in a state that the light source does not emit a light;
a first correction unit configured to correct the correspondence relationship between the plurality of pixels and a wavelength of a dispersed light received by each of the plurality of pixels stored in the storage unit, depending on, of the plurality of pixels, a pixel which receives a specific wavelength of the dispersed light; and
a second correction unit configured to, in accordance with a correction result by the first correction unit, correct the correspondence relationship between the plurality of pixels and the stray light component received by each of the plurality of pixels stored in the storage unit,
wherein the second correction unit does not correct the third correspondence relationship, but corrects the second correspondence relationship,
wherein an image formation condition of the image forming unit is controlled in accordance with a correction result in which a detection result detected by the light detection element has been corrected based on a correction result of the correction performed by the second correction unit.

8. The image forming apparatus according to claim 7,
wherein the storage unit further stores a relative relationship between a sensor output for a reference plate that serves as a reference value and the stray light component; and
the second correction unit further corrects the intensity of the stray light component stored in the storage unit using a measurement result when performing color measurement on the reference plate and the relative relationship stored in the storage unit.

9. The image forming apparatus according to claim 8, further comprising:
a calculation unit configured to correct the sensor output for the measurement target and to calculate a spectral reflectivity or a chromaticity of the measurement target based on the correction result of the second correction unit correcting the stray light component of the measurement target.

10. The image forming apparatus according to claim 7, further comprising:
a calculation unit configured to correct the sensor output for the measurement target and to calculate a spectral reflectivity or a chromaticity of the measurement target based on the correction result of the second correction unit correcting the stray light component of the measurement target.

11. The image forming apparatus according to claim 7, wherein the stray light component is measured when irradiating, with light from the light source, a measurement target for inhibiting the reflected light.

* * * * *